US012747542B2

(12) United States Patent
Philipp

(10) Patent No.: US 12,747,542 B2
(45) Date of Patent: Sep. 29, 2026

(54) SYSTEM FOR WORKING ON A TRACK

(71) Applicant: PLASSER & THEURER EXPORT VON BAHNBAUMASCHINEN GESELLSCHAFT M.B.H., Vienna (AT)

(72) Inventor: Thomas Philipp, Leonding (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 825 days.

(21) Appl. No.: 17/916,601

(22) PCT Filed: Mar. 2, 2021

(86) PCT No.: PCT/EP2021/055146
§ 371 (c)(1),
(2) Date: Oct. 3, 2022

(87) PCT Pub. No.: WO2021/197741
PCT Pub. Date: Oct. 7, 2021

(65) Prior Publication Data

US 2023/0151556 A1 May 18, 2023

(30) Foreign Application Priority Data

Apr. 1, 2020 (EP) .................................... 20167556

(51) Int. Cl.

| | |
|---|---|
| ***G01H 9/00*** | (2006.01) |
| ***E01B 27/20*** | (2006.01) |
| ***E01B 35/00*** | (2006.01) |

(52) U.S. Cl.
CPC .............. *E01B 35/00* (2013.01); *E01B 27/20* (2013.01); *G01H 9/00* (2013.01)

(58) Field of Classification Search
CPC ............ G01H 9/00; E01B 35/00; E01B 27/20
See application file for complete search history.

(56) References Cited

U.S. PATENT DOCUMENTS 5,619,250 A * 4/1997 McClellan ................ G06F 8/65 348/E7.071
8,490,737 B2 7/2013 Valcarenghi
(Continued)

FOREIGN PATENT DOCUMENTS

AT 518692 A1 * 12/2017 ............. E01B 35/12
AT 520698 A1 6/2019
(Continued)

*Primary Examiner* — Jennifer Bahls
(74) *Attorney, Agent, or Firm* — Laurence A. Greenberg; Werner H. Stemer; Ralph E. Locher

(57) ABSTRACT

A system for working on a track with a track maintenance machine has a machine controller and a work unit controlled thereby, with sensors being arranged to monitor the work unit. In this context, the sensors are coupled to a data acquisition module for the separate recording of sensor data, with the data acquisition module being connected to a computing unit in which a first algorithm for calculating result data from the sensor data is set up. In this way, the system contains additional structural components for processing sensor signals. With the data acquisition module and the computing unit, different evaluations of the working mode can be performed independently of an existing monitoring function.

13 Claims, 2 Drawing Sheets

(56) References Cited

U.S. PATENT DOCUMENTS

| | | | | |
|---|---|---|---|---|
| 2001/0039631 | A1* | 11/2001 | Barrett, Sr. | H04M 11/06<br>714/4.5 |
| 2004/0037260 | A1* | 2/2004 | Kakemizu | H04W 8/04<br>370/400 |
| 2014/0318407 | A1 | 10/2014 | Ibañez Latorre | |
| 2018/0371698 | A1* | 12/2018 | Hofer | E01B 27/022 |
| 2020/0181850 | A1 | 6/2020 | Kopf et al. | |
| 2020/0370248 | A1 | 11/2020 | Maier et al. | |
| 2021/0355638 | A1 | 11/2021 | Boeck | |

FOREIGN PATENT DOCUMENTS

| | | | | |
|---|---|---|---|---|
| AU | 2244399 | A * | 10/1999 | E01B 27/17 |
| CN | 203411871 | U | 1/2014 | |
| CN | 206862531 | U | 1/2018 | |
| CN | 110273334 | A | 9/2019 | |
| DE | 202008010351 | U1 | 1/2009 | |
| DE | 102018116317 | A1 | 1/2019 | |
| DE | 102019116538 | A1 | 1/2020 | |
| EP | 2154497 | A2 * | 2/2010 | G01M 13/045 |
| JP | S61266797 | A | 11/1986 | |
| JP | 2013510754 | A | 3/2013 | |
| WO | 2018219570 | A1 | 12/2018 | |
| WO | 2020057865 | A1 | 3/2020 | |

* cited by examiner

SYSTEM FOR WORKING ON A TRACK

FIELD AND BACKGROUND OF THE INVENTION

The invention relates to a system for working on a track with a track maintenance machine comprising a machine control and a work unit controlled thereby, with sensors being arranged to monitor work parameters. In addition, the invention relates to a method for operating the system.

A generic system is known from AT 520 698 A1. The system is used to monitor the load on a tamping unit while a track is being worked on. For this purpose, sensors are arranged that record measuring data over a period of time and forward them to an evaluation device. A load-time progression for cyclic work sequences of the tamping unit is derived from the measuring data. Conclusions drawn from this about the load situation of the tamping unit are used to specify maintenance measures or maintenance intervals.

SUMMARY OF THE INVENTION

The object of the invention is to extend the benefit of the sensors available in a system of the kind mentioned above. Furthermore, a correspondingly improved method for operating the system is to be indicated.

According to the invention, these objects are achieved by the features of the independent claims. Dependent claims indicate advantageous embodiments of the invention.

It is provided that the sensors are coupled to a data acquisition module for the separate recording of sensor data and that the data acquisition module is connected to a computing unit in which a first algorithm for calculating result data from the sensor data is set up. In this way, the system comprises additional structural components for processing sensor signals. With the data acquisition module and the computing unit in which the application-specific algorithm is set up, different evaluations of the working mode can be carried out independently of an existing monitoring function. Specific advantages result from a flexible configuration of the sensor data recording and from the option of adjusting the result data calculation.

In a further development, the computing unit is set up to calculate at least one parameter from the sensor data recorded during a work sequence, with the computing unit in particular being coupled to the machine control to automatically specify optimised working parameters. This achieves a continuous improvement of the work sequences carried out with the work unit. The calculated parameter is adjusted to the work unit in use and characterises the quality of the corresponding work sequence. The result of this improvement is a higher-level closed-loop control system at the level of a distributed control system.

Advantageously, the data acquisition module is set up for multi-channel data recording and is coupled as a slave to the computing unit designed as a master. This system architecture enables efficient connection of several sensors to the subsystem consisting of data acquisition module and computing unit.

In a further improvement, a monitoring device is arranged for monitoring the work unit, which records the sensor data at a lower sampling rate (e.g. 1 Hz) than the data acquisition module (e.g. sampling rate in the kHz range). This allows for a simple but sufficient data processing for monitoring. For the additional sensor evaluation by means of the computing unit, on the other hand, a data set with high temporal resolution is available.

An advantageous expansion of the system provides that the computing unit is coupled to a database via communication means in order to receive program data for modifying the first algorithm or for setting up a second algorithm. This way, the evaluations carried out by means of the computing unit can be modified in a simple manner. With the system, new analyses of the work sequence can be performed without having to make structural changes. In addition, new evaluation algorithms can be tested with the system before deriving adjustments of the work sequence.

In this context, it is advantageous if the communication means include a VPN router. All devices connected to this VPN router can thus use a secured VPN tunnel. This relates to the computing unit and other system components that exchange data with the database. The system-integrated VPN router creates more possibilities for secure transmission of various data.

In a further improvement, the computing unit is connected to a storage device to store sensor data and/or result data. Favourably, the storage device is dimensioned in such a way that all result data and, if necessary, all sensor data are stored until the end of a specified readout interval. For example, the readout interval corresponds to a servicing interval of the monitored work unit. In addition, data stored on the storage device can be accessed remotely at any time, preferably via a VPN tunnel. In particular, it is useful to transmit the result data via remote access. The large volume of sensor data, on the other hand, is backed up in the storage device and read out when the system is revised.

In order to make result data and, if necessary, sensor data available centrally, it is advantageous if the computing unit is coupled to a computer network (cloud) via a modem for data transmission. In this way, the data can be accessed at any time via an online application (web app).

Advantageous embodiments of the system comprise a tamping unit and/or a stabilising unit as a work unit. Such work units comprise vibrating tools that introduce oscillations into a ballasted track that has been worked on. Sensors arranged on the work units allow conclusions to be drawn about the quality of a track ballast bed and of a compaction of the track ballast. Thus, the system not only provides information on the condition and functioning of the work unit itself, but also on the condition and the work on the track.

Favourably, a movement sensor is arranged as a sensor for recording a vibration cycle. In both the tamping unit and the stabilising unit, the movement patterns and progressions of force during a vibration cycle can be used to obtain parameters for a compaction process.

In the method according to the invention for operating the system, sensor signals for monitoring the work unit are generated by means of the sensors, with sensor signals being supplied to the data acquisition module for separate sensor data recording and wherein result data are calculated from the sensor data by means of the first algorithm set up in the computing unit. With this process sequence, result data are derived from the sensor data in parallel with the monitoring of the work unit. Initially, the focus is not on the characteristic or quality of the result data, but on the use of a freely definable algorithm by means of the system components specifically provided for this purpose. These are the data acquisition module and the computing unit.

An advantageous further development of this method provides that parameters of a work sequence are calculated as result data and transmitted to the machine control. In this practical use of the system, a control loop enables the automated improvement of the work sequences performed by means of the work unit.

The method is improved by an easy-to-perform adjustment of the algorithm, with program data being transmitted to the computing unit for modifying the first algorithm or to set up a second algorithm. This is done either by means of a connection via VPN tunnel or by a direct connection to a computer on which the program data are provided.

In this context, it is advantageous if, in a first step, new program data are loaded into a storage of the computing unit and if, in a second step, the new program data are activated after a restart of the computing unit. This two-step update process ensures that any faulty program data do not result in a system failure. As a new program is only activated after the restart, the computing unit (processor) is always in a defined state.

It is useful to transfer result data from the computing unit to an external computer via a VPN tunnel or via an offline connection. The data are thus available centrally or decentrally for further processing and can be further used and archived in many ways.

BRIEF DESCRIPTION OF THE FIGURES

In the following, the invention is explained by way of example with reference to the accompanying figures. The following figures show in schematic illustrations.

DETAILED DESCRIPTION OF THE INVENTION

Figure 1:
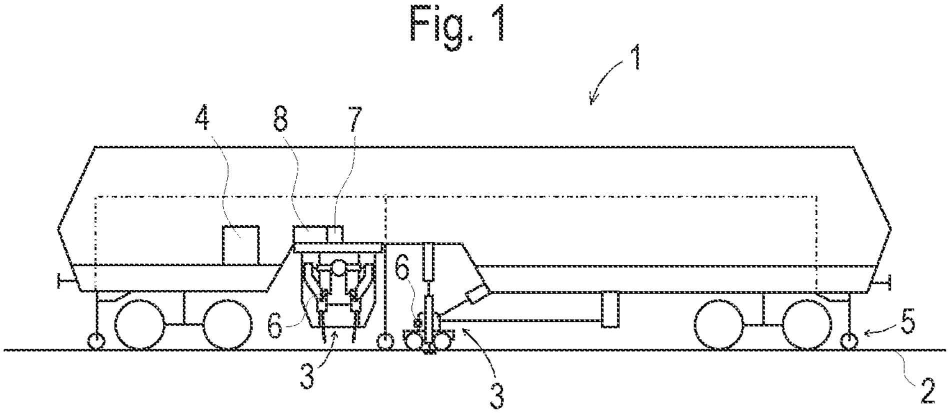
FIG. 1 Track maintenance machine
FIG. 2 Block diagram of the system
FIG. 3 Processing of program data
FIG. 4 Processing of sensor and result data

The system comprises, for example, a tamping machine as a track maintenance machine 1 for working on a track 2. Such a track maintenance machine 1 has a tamping unit and a lifting and lining unit as work units 3. In addition, a stabilising unit can be arranged as a work unit 3. The work units 3 are controlled by means of a machine control 4. Furthermore, the track maintenance machine 1 comprises a measuring system 5 for recording an actual geometry of the track 2.

Sensors 6 are arranged to monitor the work unit 3, which is designed as a tamping unit. An exemplary sensor 6 is described in the Austrian patent application A 290/2018 of the same applicant. Sensors 6 mounted on the tamping unit or on the other work units 3 measure accelerations and/or forces acting on individual work unit components. Temperature measurements can also be useful in order to monitor the condition of a work unit 3.

The respective sensor 6 generates sensor signals $S_S$, which are recorded by means of a data acquisition module 7 (DAQ) and further processed as sensor data $S_D$. For this purpose, the data acquisition module 7 is connected to a computing unit 8. In this computing unit 8, a first algorithm $P_1$ (program) is set up to calculate result data $E_D$ from the sensor data $S_D$. This result data $E_D$ is used to evaluate the work sequences performed with the work units 3 or to evaluate the condition of the track 2 worked on. For this purpose, the result data $E_D$ include corresponding parameters.

Advantageously, the computing unit 8 and the data acquisition module 7 are interconnected in a master-slave architecture. The data acquisition module 7 comprises, for example, several DAQ units with 12 to 16 channels, with each channel being assigned a sensor signal $S_S$. The data acquisition module 7 records the sensor signals $S_S$ at a high sampling rate in the range of several kilohertz in order to generate sensor data $S_D$ with high temporal resolution for subsequent processing.

For a pure monitoring function, however, sensor data $S_D$ with lower resolution are sufficient. Usually, few sensor data $S_D$ per time unit (e.g. sampling rate 1 Hz) are required to track the wear progression of a work unit component and to estimate possible servicing measures. Therefore, it is useful for the monitoring function to set up separate data processing with a dedicated data acquisition unit 9. A monitoring device 10 comprises other components, for example a microprocessor 11 and a modem 12 for transmitting monitoring data $U_D$ to a computing network (cloud) 13. Such a monitoring device 10 is described in AT 520 698 A1 of the same applicant.

It is useful to also use a modem 12 of the monitoring device 10 or a separate modem for a transmission of the result data $E_D$ generated with the computing unit 8. In this way, the result data $E_D$ and, if necessary, sensor data $S_D$ also transmitted are available centrally in the computer network 13. For example, the data $S_D$, $E_D$ can be displayed and further processed (web access) by means of a secured online application (web app) on a computer 14 with a network connection.

The track maintenance machine 1 comprises, for example, a high-performance Linux server as a computing unit 8. This makes it possible to process the recorded signal data $S_D$ at a high sampling rate in real time. In any case, it is useful to adjust the sampling rate of the data acquisition module 7 to the processing capacity of the computing unit 8 to ensure real-time calculation of result data $E_D$. Thus, various characteristic parameters of the work sequence can be determined directly on the track maintenance machine 1.

Furthermore, it is advantageous if the computing unit 8 is designed in such a way that CPU capacities are also available for processing advanced mathematical algorithms. These mathematical algorithms are models and calculation algorithms for the condition assessment of machine parts and for the adjustment of working parameters. All algorithms set up in the computing unit 8 are executed as tasks $T_1$, $T_2$, $T_n$ (processes). Specifically, a master application M runs on the computing unit 8, which starts and initiates individual tasks $T_1$, $T_2$, $T_n$ in a coordinated manner (FIG. 3).

In addition or alternatively to the transmission of sensor and result data $S_D$, $E_D$ to the computer network 13, these data $S_D$, $E_D$ are stored in a storage device 15, which is connected to the computing unit 8. For example, a dedicated processor (server) is implemented in the computing unit 8, which combines various system variables and stores the requested data $S_D$, $E_D$ on a mass storage of the storage device 15. It is possible to transfer the stored data $S_D$, $E_D$ via a data interface 16 to a computer 14, for example, during a revision of the track maintenance machine 1.

Figure 2:
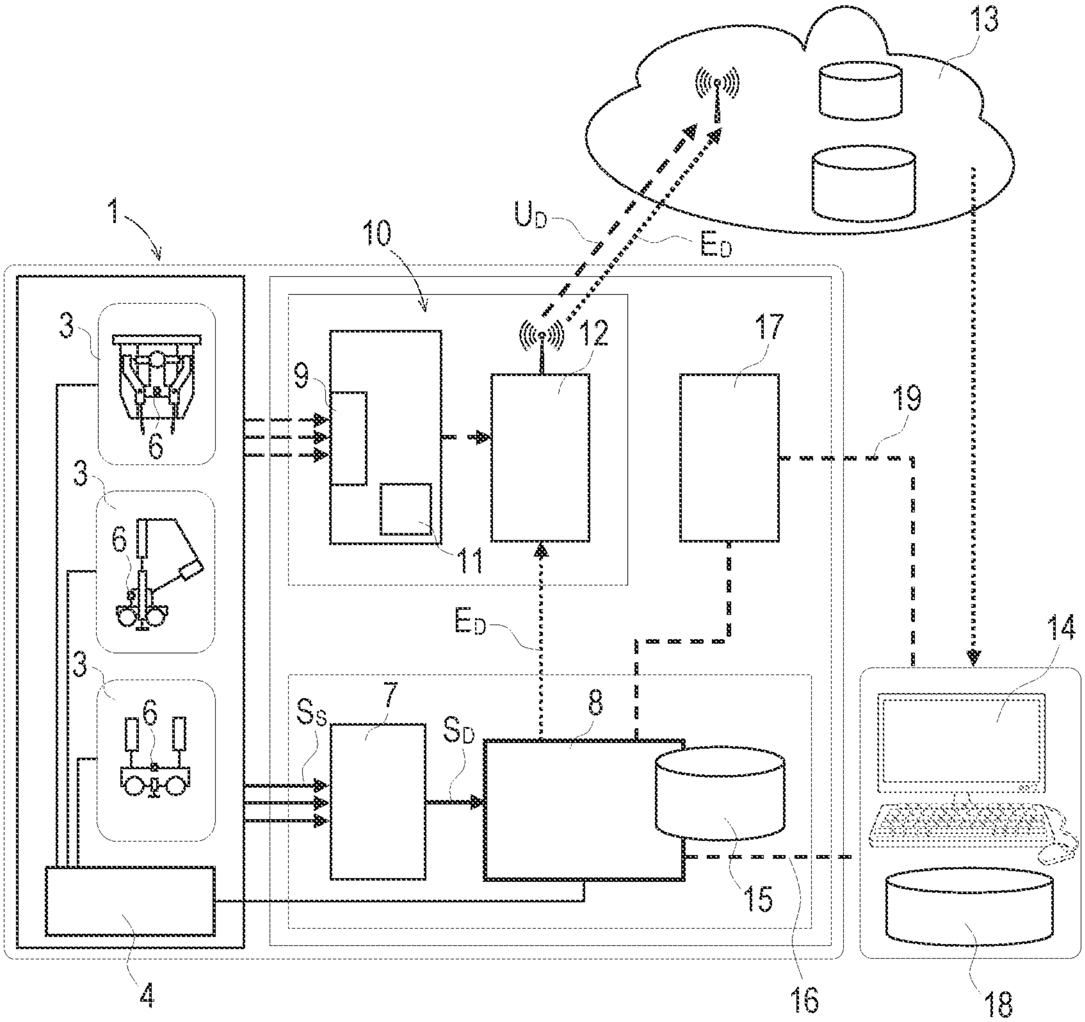

In the design version shown in FIG. 2, the system comprises communication means 17 for comparing program data with a database 18. For example, a VPN router, which is connected to the computing unit 8, is provided for this purpose. In this way, sensor and result data $S_D$, $E_D$ can also be transmitted via a VPN tunnel 19.

Figure 3:
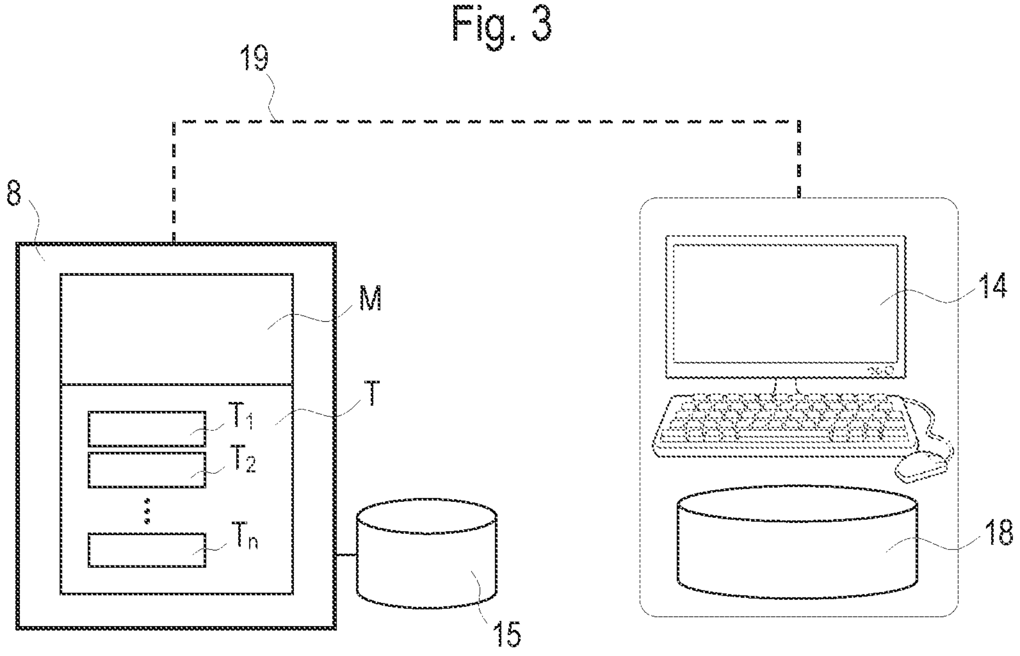

Advantageously, the VPN tunnel 19 is also used for software updates of the computing unit 8 (FIG. 3). For this purpose, an initiated task $T_n$ checks whether a new algorithm is available in the database 18. For example, to that end, a comparison is made with the current versions of the running tasks $T_1$, $T_2$. If necessary, a modified algorithm $P_1$ or a new algorithm $P_2$ is loaded via the VPN tunnel 19, compiled, and attached to the task list T. By rebooting the computing unit 8, the new tasks are started and processed.

Such an update can also be used to analyse previously unnoticed sequences on the track maintenance machine 1. First, a new algorithm $P_2$ adapted to the problem definition to be analysed is loaded into the computing unit 8 and compiled. For example, a corresponding task $T_2$ writes the sensor data $S_D$ of some selected sensors 6 to the storage 15 if a specified event occurs. After a sufficient recording period, the collected data $S_D$, $E_D$ are uploaded to the computer network 13 and analysed.

Figure 4:
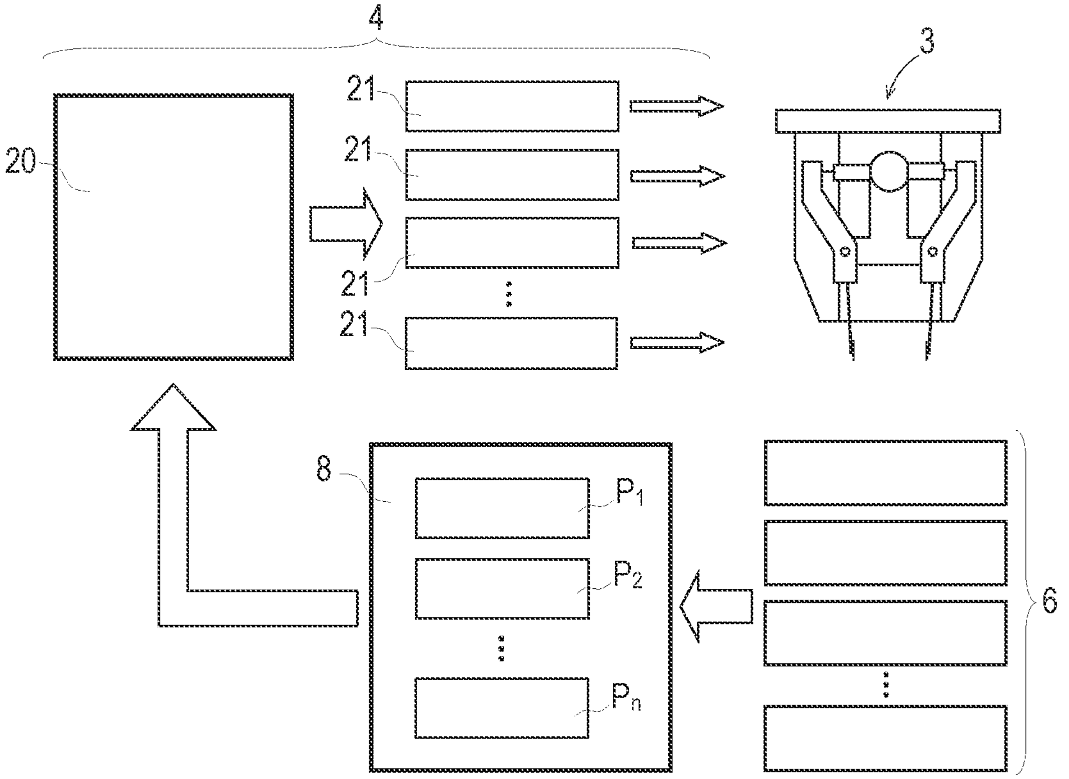

FIG. 4 illustrates a further development of the system. The work unit 3 is monitored by means of various sensors 6. These sensors 6 and other sensors 6 arranged on the track maintenance machine 1 (inertial measuring unit, laser cutting sensor, hydraulic pressure gauge, etc.) provide sensor data $S_D$ to the computing unit 8 via the data acquisition module 7. By means of various algorithms $P_1$, $P_2$, $P_n$, control-relevant parameters are calculated as result data $E_D$. The respective parameters are fed back into the machine control 4, which subsequently results in an active intervention in the work process.

For this purpose, the machine control 4 (control system of the track maintenance machine 1) comprises a central control 20, by means of which several decentralised subsystems 21 are coordinated. These are, for example, a subsystem 21 for a speed adjustment of a vibration drive for generating vibrations, a subsystem 21 for a tamping tine opening width of a tamping unit, a subsystem 21 for an automatic penetration system for tamping tines, and a subsystem 21 for the work unit positioning.

Thus, physical parameters of the influenced work sequence are recorded and measured. The recorded parameters are fed as a data stream to the computing unit 8, with all tasks $T_1$, $T_2$, $T_n$ having full access to this sensor data $S_D$. During the execution of the tasks $T_1$, $T_2$, $T_n$, characteristic parameters of the work sequence are determined. These parameters are then fed back to the central control 20 in order to preset optimised working parameters for the subsystems 21. In this way, a higher-level closed-loop system with an observation-based controller is set up at the level of a distributed control system.

In an advantageous further development, the calculation of the optimised working parameters takes place directly in the computing unit 8. For this purpose, corresponding algorithms $P_1$, $P_2$, $P_n$ are set up in the computing unit 8. The newly calculated work parameters are specified for the central control 20. Thus, no parameter calculation takes place in the machine control 4 itself. Safety requirements applicable to the machine control 4 are not affected in this way.

The specification of new working parameters is explained in more detail using the example of multiple tamping by means of a tamping unit. In multiple tamping, vibrating tamping tines are lowered into a ballast bed at the same spot, and they squeeze several times to improve ballast compaction.

For parameter optimisation, sensor data $S_D$ is first recorded over a longer observation period. For example, pressures and strokes of squeezing cylinders of the tamping unit are recorded. Characteristic parameters are calculated for each recorded tamping cycle, which serve as basic data in the next step.

The basic data recorded with the present system are available offline to train a predictive model. Specifically, the recorded data and a respective target variable (number of tamping insertions per tamping cycle) serve as training data. The trained predictive model corresponds to a new algorithm $P_2$ that enables a prediction of the target variable.

Through testing and validation, the new algorithm $P_2$ can be further improved. The test data used differs from the previously used training data. The predictions of the target variables are adjusted to specified target values to evaluate the quality of the predictive model. If necessary, the algorithm $P_2$ is subjected to a new training step to improve the predictive quality.

With the finished algorithm $P_2$, the respective working parameter (target variable) is specified in real time directly on the track maintenance machine 1. As soon as the tamping tines penetrate the ballast bed, the sensors 6 provide meaningful sensor data $S_D$ for calculating parameters for the condition of the ballast bed. In any case, at the end of a first tamping insertion, sufficient sensor data $S_D$ are available to calculate reliable result data $E_D$. In the present example, the result data $E_D$ of the machine control 4 specify in real time whether a further tamping insertion is necessary at the same spot in order to achieve the desired compaction.

A further advantage of the present system arises with multi-sleeper tamping units with several tamping units arranged one behind the other. These tamping units are lowered together into a ballast bed to simultaneously tamp several sleepers. Here, the sensor data $S_D$ recorded and processed in real time are used to control the individual tamping units differently. Specifically, the condition of the ballast bed that is determined when the tamping tines penetrate the ballast bed is used to specify different squeezing pressures. If necessary, different squeezing times are specified for the individual tamping units. In the case of simultaneous tamping of several sleepers, there is sometimes the problem that the ballast bed in its initial condition has a different ballast compaction under each sleeper.

For each tamping unit, a parameter calculated from the assigned sensor data $S_D$ already indicates the respective degree of compaction at the relevant spot of the ballast bed during a penetration process. By means of a corresponding algorithm $P_2$, an adapted squeezing pressure and, if necessary, an adapted squeeze time are specified for the respective sub-control. In spots where the degree of compaction is already increased, less tamping energy is introduced into the ballast bed by reducing the squeezing pressure and the squeezing time. However, at penetration spots with a low degree of compaction, squeezing takes place with increased pressure and a longer duration. In this way, a homogeneous compaction of the ballast is achieved for the ballast bed section worked on with the multiple-sleeper tamping unit.

The invention claimed is:

1. A system for working on a track, comprising:

a track maintenance machine containing:

- a machine controller;
- a work unit controlled by said machine controller;
- sensors disposed to monitor said work unit and outputting sensor data;
- a data acquisition module, said sensors are coupled to said data acquisition module for a separate recording of the sensor data resulting in data acquisition sensor data;
- a monitor for monitoring said work unit, said monitor recording the sensor data at a lower sampling rate than said data acquisition module resulting in monitoring sensor data, the monitoring sensor data being used to monitor a wear progression of said work unit; and a computer, said data acquisition module connected to said computer for calculating result data from the data acquisition sensor data captured by said data acquisition module.

2. The system according to claim 1, wherein said data acquisition module is set up for multi-channel data recording and is coupled as a slave to said computer functioning as a master.

3. The system according to claim 1, further comprising:

a database; and a communication means, said computer is coupled to said database via said communication means in order to receive program data.

4. The system according to claim 3, wherein said communication means includes a virtual private network (VPN) router.

5. The system according to claim 1, further comprising a storage device, said computer is connected to said storage device to store the data acquisition sensor data, the monitoring sensor data and/or the result data.

6. The system according to claim 1, further comprising a modem, said computer is coupled to a computer network via said modem for data transmission.

7. The system according to claim 6, wherein said sensors include a movement sensor for recording a vibration cycle.

8. The system according to claim 1, wherein said work unit is a tamping unit and/or a stabilizing unit.

9. The system according to 1, wherein said computer is coupled to said machine controller to automatically specify working parameters.

10. A method for operating a system for working on a track, the system having a track maintenance machine with a machine controller, a work unit controlled by the machine controller, sensors disposed to monitor the work unit, a data acquisition module, a monitor and a computer, which comprises the steps of:

generating sensor signals for monitoring the work unit by means of the sensors;

supplying the sensor signals to the data acquisition module for separate sensor data recording resulting in data acquisition sensor data;

calculating result data from the data acquisition sensor data recorded by the data acquisition module by means of said computer, the result data containing parameters of a work sequence and transmitting the parameters to the machine controller:

monitoring the work unit via the monitor, the monitor recording the sensor signals at a lower sampling rate than the data acquisition module resulting in monitoring sensor data;

using the monitoring sensor data to monitor a wear progression of the working unit; and operating the work unit based on the parameters calculated resulting in a higher-level closed loop control system.

11. The method according to claim 10, which further comprises transmitting program data to the computer.

12. The method according to claim 10, wherein in a first step, new program data are loaded into a storage of the computer and, in a second step, the new program data are activated after a restart of the computer.

13. The method according to claim 10, which further comprises transferring the result data from the computer to an external computer via a virtual private network tunnel or via an offline connection.

* * * * *